United States Patent
Lee et al.

(10) Patent No.: US 9,083,489 B2
(45) Date of Patent: Jul. 14, 2015

(54) BLOCK ENCRYPTION METHOD AND APPARATUS

(71) Applicant: Electronics and Telecommunications Research Institute, Daejeon (KR)

(72) Inventors: Seung Kwang Lee, Daejeon (KR); Doo Ho Choi, Daejeon (KR); Taesung Kim, Daejeon (KR); Yong-Je Choi, Daejeon (KR); Kyunghee Oh, Daejeon (KR); Ju Han Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 64 days.

(21) Appl. No.: 13/943,188

(22) Filed: Jul. 16, 2013

(65) Prior Publication Data

US 2014/0286486 A1 Sep. 25, 2014

(30) Foreign Application Priority Data

Mar. 25, 2013 (KR) .......................... 10-2013-0031652

(51) Int. Cl.
*H04L 9/06* (2006.01)
*H04L 9/00* (2006.01)

(52) U.S. Cl.
CPC .............. *H04L 9/003* (2013.01); *H04L 9/0631* (2013.01); *H04L 2209/08* (2013.01); *H04L 2209/125* (2013.01)

(58) Field of Classification Search
CPC ........................................... H04L 9/002–9/005
See application file for complete search history.

(56) References Cited

U.S. PATENT DOCUMENTS 6,408,075 B1 * 6/2002 Ohki et al. ...................... 380/28
2009/0010424 A1 * 1/2009 Qi et al. .......................... 380/28

FOREIGN PATENT DOCUMENTS

KR 1020110080036 A 7/2011

OTHER PUBLICATIONS

ETSI, Universal Mobile Telecommunications System (UMTS); 3G Security; Report on the design and evaluation of the MILENAGE algorithm set; Deliverable 5: An example algorithm for the 3GPP authentication and key generation functions, Jun. 2001, 3GPP, TR 33.909 version 4.0.1 Release 4.*
Hossung Jeon et al., "Correlation Power Analysis of the AES-Milenage", Proceedings of the Korean Society for Internet Information Conference 2011, pp. 47-48, vol. 12, No. 1, Department of Mathematics, Kookmin University, Seoul, Korea.

* cited by examiner

*Primary Examiner* — Gilberto Barron, Jr.
*Assistant Examiner* — Arya Golriz
(74) *Attorney, Agent, or Firm* — William Park & Associates Ltd.

(57) ABSTRACT

In accordance with an embodiment, the logical exclusive operation on the random number RAND and the OPc value are performed several times, the logical operation and encryption processing using a random number RAND and logical operation and encryption processing using a random number S are done in any order, which brings an increase of an attack complexity as to whether to calculate the correlation coefficient from the power consumption waveform at any point when analyzing the correlation power, whereby it is possible to defend the CPA attack effectively.

4 Claims, 3 Drawing Sheets

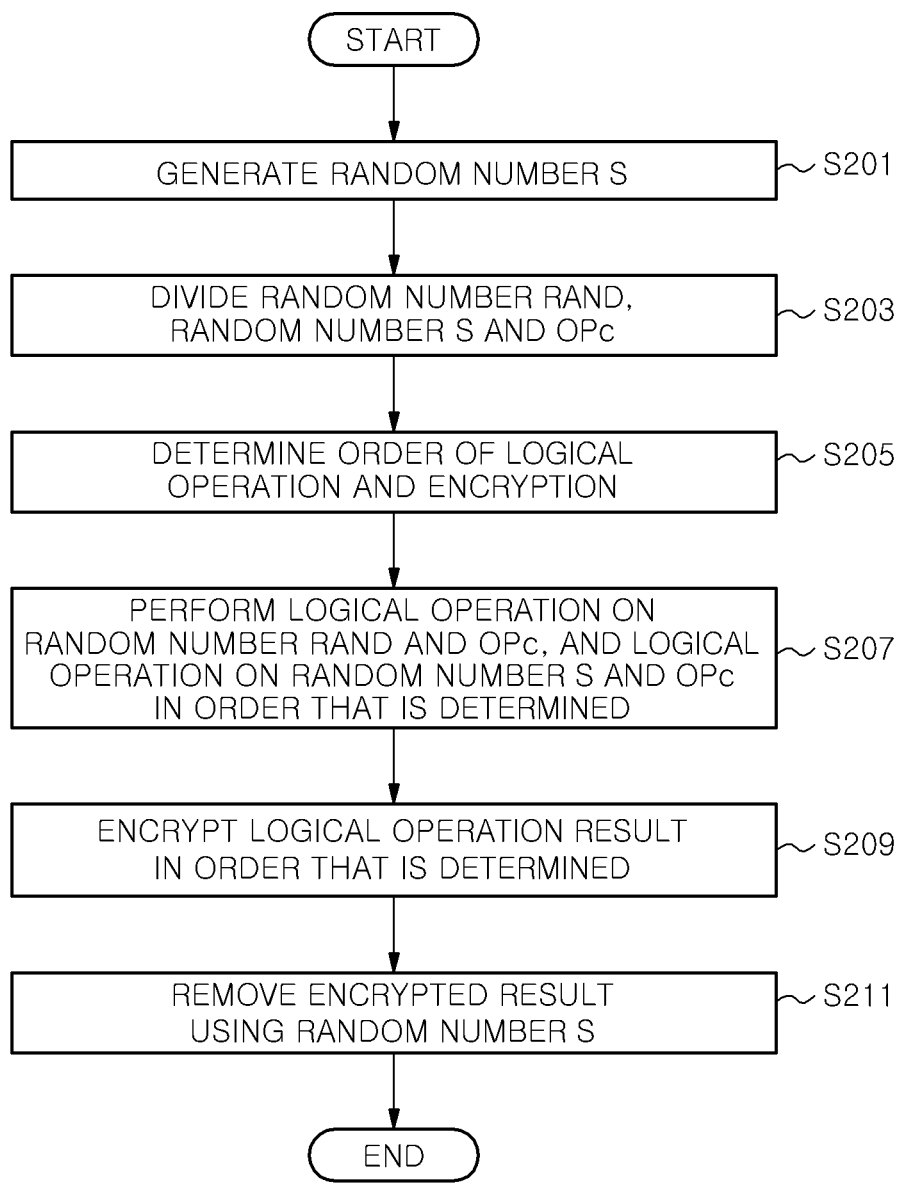

BLOCK ENCRYPTION METHOD AND APPARATUS

RELATED APPLICATIONS

This application claims the benefit of Korean Patent Application No. 10-2013-0031652, filed on Mar. 25, 2013, which is hereby incorporated by reference as if fully set forth herein.

FIELD OF THE INVENTION

The present invention relates to a block encryption method and apparatus, and more particularly, to a block encryption method and apparatus for processing a logical operation and block encryption on a random number RAND and an OPc that has been generated by encrypting an OP (OPerator variant algorithm configuration field) with a block cipher algorithm.

BACKGROUND OF THE INVENTION

As is well known, in a 3G (3rd generation) mobile communication, subscriber authentication is done via a USIM (Universal Subscriber Identity Module). The USIM has a form which is a combination of a SIM (Subscriber Identity Module) in an application form equipped with subscriber information and a UICC (Universal IC Card) which means a smart card hardware platform to accommodate multi-application. Such a USIM is a smart card that is mounted on a 3G mobile telecommunication terminal, enables the 3G mobile communication terminal to access services provided from a mobile communication network or to receive communication services such as a subscriber authentication and global roaming, and, in addition to, supports various additional services such as e-commerce and the like.

In the 3G generation mobile communication, a new authentication protocol has been designed in order for the vulnerability complement of a 2G authentication mechanism and for two-way authentication. Accordingly, the 3GPP (3rd Generation Partnership Project) has recommended the use of the Milenage key generation algorithm which is a core algorithm of authentication mechanisms.

The Milenage key generation algorithm is a kind of key generation algorithms used in authentication, integrity, anonymity and the like and uses a block cipher algorithm. Authentication and key generation are internally done in the Milenage key generation algorithm using an AES (Advanced Encryption Standard). Inputs to the Milenage key generation algorithm are a randomly generated 128-bit random number RAND and an OPc value that has been generated by encrypting a 128-bit OP specified by an operator with a block cipher algorithm. The RAND and the OPc value are experienced a logical exclusive-OR operation to generate a value, which in turn is provided to an input to the block cipher algorithm, to thereby produce a set of session keys f1, f1*, f2, f3, f4, f5, f5*.

However, the Milenage key generation algorithm has inherently a problem that a master key used to generate an authentication key may be leaked out by a CPA (Correlation Power Analysis).

A process of an attack using the CPA is as follows.

A random number RAND which is experienced a logical exclusive-OR operation in the USIM is a plaintext to the input of the Milenage key generation algorithm, and an OPc value is a fixed value that is calculated in the USIM or stored in advance, all of which are unknown to an attacker.

The attacker needs to know the input values entering an AES in order to attack the AES. In order to achieve this, it is necessary to catch the value of the OPc first. Therefore, the attacker generates a random number NAND and an OPc value to the input of the Milenage key generation algorithm first.

Next, the random number RAND and the OPc value are experienced a logical exclusive-OR operation. During the operation, in order for carrying out a sub-channel attack to which a power model is applied on the logical exclusive-OR operation, a value for estimating the amount of power consumed in performing the logical exclusive-OR operation, i.e., a value of a hamming weight is obtained.

Moreover, the random number RAND is actually entered into the input of the Milenage key generation algorithm and a power consumption waveform is collected at a point where the logical exclusive-OR operation is performed on the OPc value and the random number RAND.

Next, a correlation coefficient is calculated using a Pearson correlation formula between the power consumption waveform collected from the point of an attack and the Hamming weight previously obtained. In this case, the CPA is done by calculating the value of the correlation coefficient between the power consumption and the Hamming weight.

The OPc value is gotten by obtaining a point that the highest value of the correlation coefficients occurs and a value corresponding to the point. When the OPc value has been obtained, the attacker can select the random number RAND already, and, therefore, able to know the input values to the AES. Consequently, the attacker can make a CPA attack on the AES to which a prevention technology is eliminated.

SUMMARY OF THE INVENTION

In view of the above, the present invention is proposed to overcome the above described problem and provides a block encryption method and apparatus, which is capable of preventing a CPA attack against an AES-Milenage.

In accordance with a first aspect of the present invention, there is provided a block encryption method includes: dividing an OPc, a random number RAND and a random number S into a unit of a predetermined byte to generate an OPc division value, a RAND division value and S division value, wherein the OPc is generated by encrypting an OP (operator variant algorithm configuration field) using a block cipher algorithm; determining the order of a processing using the RAND and OPc division values and a processing using the S and OPc division values; sequentially performing a logical operation on the RAND and OPc division values and a logical operation on the S and OPc division values in the order that is determined; sequentially performing a block encryption on a logical operation result of the RAND and OPc division values and a block encryption on a logical operation result of the S and OPc division values in the order that is determined; removing a result of the block encryption performed on the logical operation result of the S and OPc division values and outputting a result of the block encryption performed on the logical operation result of the RAND and OPc division values.

Further, the method may determining the order comprises determining the order of the logical operation and the order of the block encryption separately.

Further, determining the order comprises determining the order of the logical operation and the order of the block encryption randomly.

In accordance with a second aspect of the present invention, there is provided a block encryption apparatus includes: an obfuscation unit configured to divide an OPc, a random number RAND and a random number S into a unit of a predetermined byte to generate an OPc division value, a RAND division value and S division value, wherein the OPc is generated by encrypting an OP (operator variant algorithm configuration field) using a block cipher algorithm; an order determination unit configured to determine the order of a processing using the RAND and OPc division values and a processing using the S and OPc division values; a logical operation unit configured to sequentially perform a logical operation on the RAND and OPc division values and a logical operation on the S and OPc division values in the order that is determined; an encryption unit configured to sequentially perform a block encryption on a logical operation result of the RAND and OPc division values and a block encryption on a logical operation result of the S and OPc division values in the order that is determined; a data output unit configured to remove a result of the block encryption performed on the logical operation result of the S and OPc division values and output a result of the block encryption performed on the logical operation result of the RAND and OPc division values.

Further, the apparatus may the order determination unit is configured to determine the order of the logical operation and the order of the block encryption separately.

Further, the order determination unit is configured to determine the order of the logical operation and the order of the block encryption randomly.

In accordance with an embodiment of the present invention, the logical exclusive operation on the random number RAND and the OPc value are performed several times, the logical operation and encryption processing using a random number RAND and logical operation and encryption processing using a random number S are done in any order, which brings an increase of an attack complexity as to whether to calculate the correlation coefficient from the power consumption waveform at any point when analyzing the correlation power, whereby it is possible to defend the CPA attack effectively.

BRIEF DESCRIPTION OF THE DRAWINGS

The above and other objects and features of the present invention will become apparent from the following description of the embodiments given in conjunction with the accompanying drawings, in which:

FIG. 3 is a flow chart illustrating a block encryption method in accordance with an embodiment of the present invention.

DETAILED DESCRIPTION OF THE EMBODIMENTS

Figure 1:
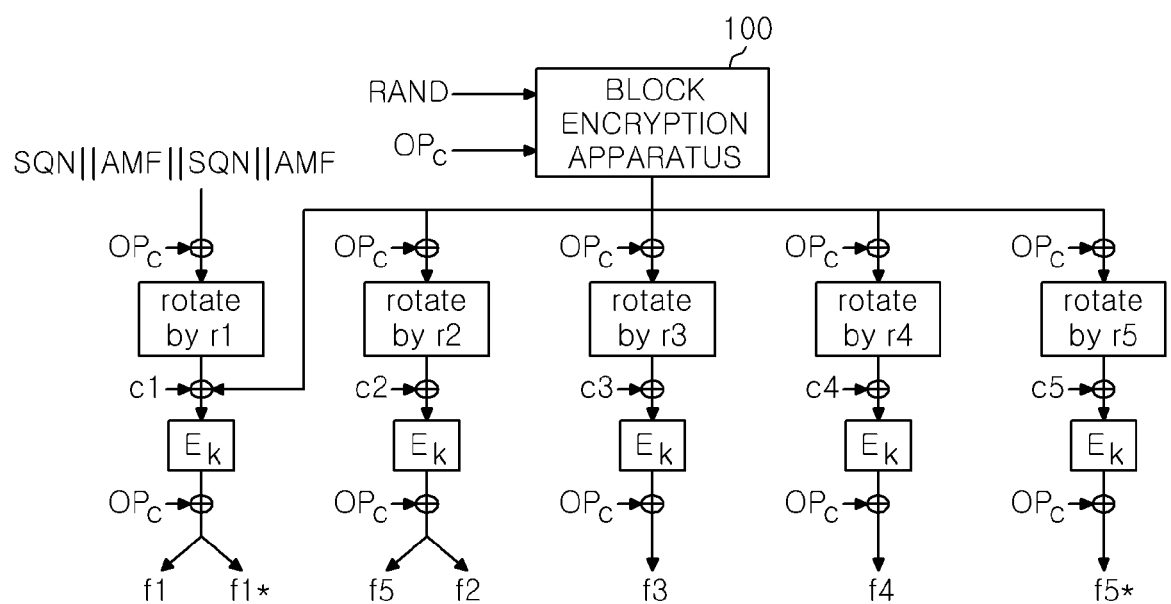
FIG. 1 is a conceptual diagram of the Milenage key generation algorithm to which a block encryption method is applicable in accordance with an embodiment of the present invention.

Advantages and features of the invention and methods of accomplishing the same may be understood more readily by reference to the following detailed description of embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms need to be defined throughout the description of the present invention.

Hereinafter, the embodiments of the present invention will be described in detail with reference to the accompanying drawings.

FIG. 1 is a conceptual diagram of the Milenage key generation algorithm to which a block encryption method is applicable in accordance with an embodiment of the present invention.

As shown in drawing, a block encryption apparatus 100 capable of performing a block encryption method in accordance with an embodiment of the present invention is applied to the Milenage key generation algorithm, and the block encryption apparatus 100 executes a block encryption processing capable of defending a CPA (Correlation Power Analysis) attack by entering a random number RAND and an OPc that has been generated by encrypting an OP (operator variant algorithm configuration field) with a block cipher algorithm.

In FIG. 1, an $E_K$ is a block cipher algorithm, an AES-Milenage (Advanced Encryption Standard-Milenage) is an AES-based Milenage algorithm with a block cipher algorithm (Ek) as an AES, a RAND is a 128-bit random number, an OP is a value arbitrarily generated by an operator, $\oplus$ is a logical exclusive-OR operation (XOR), and c1, c2, c3, c4, and c5 are constant values.

Inputs to the block encryption apparatus 100 are a 128-bit random number RAND that is randomly generated and the OPc value that has been generated by encrypting a 128-bit OP specified by an operator with a block cipher algorithm. Inputs to an AES are a result from the block encryption apparatus 100, an SQN (sequence number) and an AMF (Authentication Management Field), to generate a set of session keys f1, f1*, f2, f3, f4, f5, f5*.

Figure 2:
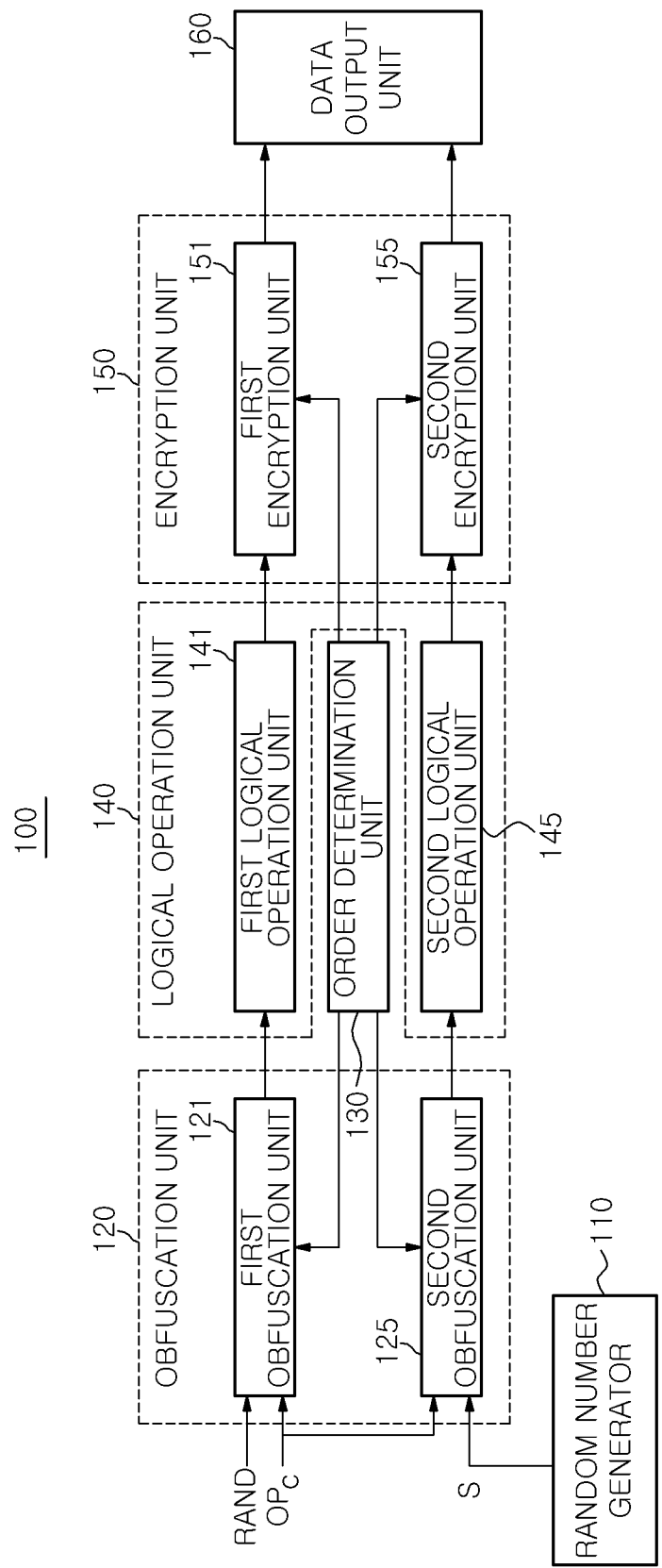
FIG. 2 is a block diagram of a block encryption apparatus in accordance with an embodiment of the present invention.

FIG. 2 is a block diagram of a block encryption apparatus in accordance with an embodiment of the present invention.

As shown in the drawing, the block encryption apparatus 100 includes a random number generator 110, an obfuscation unit 120, an order determination unit 130, a logical operation unit 140, an encryption unit 150 and a data output unit 160. The obfuscation unit 120 includes a first obfuscation unit 121 and a second obfuscation unit 125; the logical operation unit 140 includes a first logical operation unit 141 and a second logical operation unit 145; and the encryption unit 150 includes a first encryption unit 151 and a second encryption unit 155.

The random number generator 110 generates a 128-bit random number S and provides the random number S to the second obfuscation unit 125. In this embodiment, the random number generator 110 may be removed in a case where the random number S is generated in the exterior and is then provided to the second obfuscation unit 125.

The first obfuscation unit 121 divides an OPc that has been generated by encrypting an OP with a block cipher algorithm and a random number RAND into a unit of a predetermined byte to generate an OPc division value and a RAND division value. The OPc and RAND division values are provided to the first logical operation unit 141 at an appropriate time in accordance with a sequence control of the order determination unit 130.

The second obfuscation unit 125 divides the OPc that has been generated by encrypting an OP with a block cipher algorithm and the random number S in a unit of a predetermined byte to generate an OPc division value and an S division value. The OPc and S division values are provided to the second logical operation unit 145 at an appropriate time in accordance with a sequence control of the order determination unit 130.

The order determination unit 130 determines the order of a processing using the RAND and OPc division values and a processing using a set of the S and OPc division values. In other words, the order determination unit 130 determines the order of processing a set of the RAND and OPc division values and the order of processing a set of the S and OPc division values. The order determination unit 130 adjusts the point of time when the RAND and OPc division values will be provided and the point of time when the S and OPc division values will be provided by controlling the first obfuscation unit 121 and the second obfuscation unit 125, and controls the order for the block encryption of the first encryption unit 151 and the second encryption unit 155.

The first logical operation unit 141 performs a logical operation on the RAND and OPc division values in order of the logical operation that is determined by the order determination unit 130.

The second logical operation unit 145 performs a logical operation on the S and OPc division values in order of the logical operation that is determined by the order determination unit 130.

The first encryption unit 151 performs a block encryption on a result value of the logical operation of the RAND and OPc division values in order of the block encryption that is determined by the order determination unit 130.

The second encryption unit 155 performs a block encryption on a result value of the logical operation of the S and OPc division values in order of the block encryption that is determined by the order determination unit 130.

The data output unit 160 removes an encrypted result of the second encryption unit 155 that has performed the block encryption on the logical operation result of the S and OPc division values and outputs an encrypted result of the first encryption unit 151 that has performed the block encryption on the logical operation result of the RAND and OPc division values.

FIG. 3 is a flow chart illustrating a block encryption method in accordance with an embodiment of the present invention.

As shown in drawing, a block encryption method in accordance with an embodiment of the present invention includes: dividing an OPc, a random number RAND and a random number S into a unit of a predetermined byte to generate an OPc division value, a RAND division value and S division value, wherein the OPc is generated by encrypting an OP using a block cipher algorithm, in operations S201 and S203; determining order of a processing using the RAND and OPc division values and a processing using the S and OPc division values, in an operation S205; sequentially performing a logical operation on the RAND and OPc division values and a logical operation on the S and OPc division values in the order that is determined, in an operation S207; sequentially performing a block encryption on a logical operation result of the RAND and OPc division values and a block encryption on the logical operation result of the S and OPc division values in the order that is determined, in an operation S209; removing a result of the block encryption performed on the logical operation result of the S and OPc division values and outputting a result of the block encryption performed on the logical operation result of the RAND and OPc division values, in an operation S211.

Hereinafter, a process of the block encryption method performed by the block encryption apparatus will be described with reference to FIGS. 1 to 3.

First, in an operation S201, an opc that has been generated by encrypting an OP with a block cipher algorithm is input to both the first obfuscation unit 121 and the second obfuscation unit 125, and a 128-bit random number RAND is input to the first obfuscation unit 121. In addition, the first obfuscation unit 121 generates a 128-bit random number S and provides the random number S to the second obfuscation unit 125.

After that, in an operation S203, the first obfuscation unit 121 divides the OPc and the random number RAND into a unit of a predetermined byte to generate an OPc division value and a RAND division value, and the second obfuscation unit 125 divides the OPc that has been generated by encrypting an OP with a block cipher algorithm and the random number S into a unit of a predetermined byte to generate an OPc division value and an S division value. For example, each of the first and second obfuscation units 12a and 125 may divide the OPc, the RAND, or the S into a unit of four bytes. Here, the OPc division value is represented by $K_3 \| K_2 \| K_1 \| K_0$, the RAND division value is represented $R_3 \| R_2 \| R_1 \| R_0$, and the S division value is represented as $S_3 \| S_2 \| S_1 \| S_0$, where $\|$ denotes a concatenation operator which is a join operator.

At this time, the order determination unit 130 determines the order of a processing using the RAND and OPc division values and a processing using the S and OPc division values, adjusts the point of time when the RAND and OPc division values will be provided and the point of time when the S and OPc division values will be provided by controlling the first obfuscation unit 121 and the second obfuscation unit 125, and controls the order for the block encryption of the first encryption unit 151 and the second encryption unit 155, in an operation S205.

The first obfuscation unit 121 then provides the OPc and RAND division values to the first logical operation unit 141 at an appropriate time in accordance with a sequence control of the order determination unit 130, and the second obfuscation unit 125 provides the OPc and S division values to the second logical operation unit 145 at an appropriate time in accordance with a sequence control of the order determination unit 130.

Subsequently, the first logical operation unit 141 performs a logical operation on the RAND and OPc division values in order of the logical operation that is determined by the order determination unit 130, and the second logical operation unit 145 performs a logical operation on the S and OPc division values in order of the logical operation that is determined by the order determination unit 130, in an operation S207.

Further, the first encryption unit 151 performs a block encryption on a logical operation result of the RAND and OPc division values in order of the encryption that is determined by the order determination unit 130, and the second encryption unit 155 performs a block encryption on a logical operation result of the S and OPc division values in order of the encryption that is determined by the order determination unit 130, in an operation S209.

For example, the logical operation performed by the first logical operation unit 141 and the encryption processing executed by the encryption unit 150 may be performed over several times by the number of divisions performed on the OPc, RAND and S by the obfuscation unit 120. Furthermore, the order determination unit 130 may separately determine the order of the logical operation and the order of the encryption processing, and the order may be determined at random so that no one can predict the order.

Next, in an operation S211, the data output unit 160 removes an encrypted result of the second encryption unit 155 that has performed the block encryption on the logical operation result of the S and OPc division values, and the data output unit 160 outputs an encrypted result of the first encryption unit 151 that has performed the block encryption on the logical operation result of the RAND and OPc division values.

Meanwhile, the process of the block encryption as described in the operations S201 to S211 may be expressed in a programming language as follows.

```
Begin
Begin [Obfuscation]
S ∈_R {0,1}^128              // generate 128-bit random number S
For i=0 to 3
    Coin ∈_R {0,1}           // generate a random number 1-bit
    if Coin = 0
        Temp1[i] ← Ri ⊕ Ki   // OPc = K3||K2||K1||K0
        Temp2[i] ← Si ⊕ Ki   // S = S3||S2||S1||S0
    else if
        Temp2[i] ← Si ⊕ Ki
        Temp1[i] ← Ri ⊕ Ki
    End if
End [Obfuscation]
Coin ∈_R {0,1}
if Coin = 0
      AES(Temp1);
      AES(Temp2);
    Else if
      AES(Temp2);
      AES(Temp1);
    End if
    // a result value of AES(Temp1) will be used in a subsequent
    Milenage operation and AES(Temp2) is removed.
          End
```

As described above, in accordance with the block encryption method and apparatus in accordance with an embodiment of the present invention, an exclusive logical operation is carried out over several times, and a logical operation and an encryption process using a random number RAND and a logical operation and an encryption process using a random number S are carried out randomly, and, therefore, the attack complexity will be increased to determine whether to calculate the relationship coefficient from the power waveform at any point when analyzing the correlation power.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A block encryption method comprising:
    dividing an OPc, a random number RAND and a random number S into a unit of a predetermined byte to generate an OPc division value, a RAND division value and S division value, wherein the OPc is generated by encrypting an OP (operator variant algorithm configuration field) using a block cipher algorithm;
    determining the order of a processing using the RAND and OPc division values and a processing using the S and OPc division values;
    sequentially performing a logical operation on the RAND and OPc division values and a logical operation on the S and OPc division values in the order that is determined;
    sequentially performing a block encryption on a logical operation result of the RAND and OPc division values and a block encryption on a logical operation result of the S and OPc division values in the order that is determined; and
    removing a result of the block encryption performed on the logical operation result of the S and OPc division values and outputting a result of the block encryption performed on the logical operation result of the RAND and OPc division values,
    wherein said determining the order comprises determining the order of the logical operation and the order of the block encryption separately.

2. The block encryption method of claim 1, wherein said determining the order comprises:
    determining the order of the logical operation and the order of the block encryption randomly.

3. A block encryption apparatus comprising:
    an obfuscation unit configured to divide an OPc, a random number RAND and a random number S into a unit of a predetermined byte to generate an OPc division value, a RAND division value and S division value, wherein the OPc is generated by encrypting an OP (operator variant algorithm configuration field) using a block cipher algorithm;
    an order determination unit configured to determine the order of a processing using the RAND and OPc division values and a processing using the S and OPc division values;
    a logical operation unit configured to sequentially perform a logical operation on the RAND and OPc division values and a logical operation on the S and OPc division values in the order that is determined;
    an encryption unit configured to sequentially perform a block encryption on a logical operation result of the RAND and OPc division values and a block encryption on a logical operation result of the S and OPc division values in the order that is determined; and
    a data output unit configured to remove a result of the block encryption performed on the logical operation result of the S and OPc division values and output a result of the block encryption performed on the logical operation result of the RAND and OPc division values,
    wherein the order determination unit is configured to determine the order of the logical operation and the order of the block encryption separately.

4. The block encryption apparatus of claim 3, the order determination unit is configured to determine the order of the logical operation and the order of the block encryption randomly.

* * * * *